US012742515B2

(12) United States Patent
Hung

(10) Patent No.: US 12,742,515 B2
(45) Date of Patent: Sep. 22, 2026

(54) CONNECTING DEVICE FOR A SUSPENSION ARM APPARATUS

(71) Applicant: MODERNSOLID INDUSTRIAL CO., LTD., Taichung City (TW)

(72) Inventor: Chin-Jui Hung, Taichung City (TW)

(73) Assignee: MODERNSOLID INDUSTRIAL CO., LTD., Taichung City (TW)

( * ) Notice: Subject to any disclaimer, the term of this patent is extended or adjusted under 35 U.S.C. 154(b) by 224 days.

(21) Appl. No.: 18/783,782

(22) Filed: Jul. 25, 2024

(65) Prior Publication Data

US 2025/0043902 A1 Feb. 6, 2025

(30) Foreign Application Priority Data

Aug. 4, 2023 (TW) ................................ 112129349

(51) Int. Cl.
*F16M 11/06* (2006.01)

(52) U.S. Cl.
CPC ......... *F16M 11/06* (2013.01); *F16M 2200/06* (2013.01)

(58) Field of Classification Search
CPC ...... F16M 11/02; F16M 11/04; F16M 11/041; F16M 11/06; F16M 11/08; F16M 11/10; F16M 11/12; F16M 2200/028; F16M 13/022; F16B 17/008
See application file for complete search history.

(56) References Cited

U.S. PATENT DOCUMENTS 6,367,756 B1 * 4/2002 Wang ................ F16M 11/2014 248/278.1
9,016,646 B2 * 4/2015 Hung .................. F16M 13/027 248/278.1
9,316,346 B2 * 4/2016 Lau ...................... F16M 13/022
9,706,843 B2 * 7/2017 Hung ..................... F16M 11/24
9,993,071 B2 * 6/2018 Hung ..................... A47B 21/04
(Continued)

FOREIGN PATENT DOCUMENTS

CN 101943310 A 1/2011
CN 209725687 U 12/2019
(Continued)

OTHER PUBLICATIONS

Search Report appended to an Office Action, which was issued to Taiwanese counterpart application No. 112129349 by the TIPO on May 10, 2024, with an English translation thereof.

*Primary Examiner* — Jonathan P Masinick
(74) *Attorney, Agent, or Firm* — Burris Law, PLLC

(57) ABSTRACT

A connecting device includes an installing seat adapted to be mounted to a supporting arm device and defining a slotting space that has a slot opening, a tab module disposed removably in the slotting space and adapted to be removably connected to a monitor, and a rotating plate coupled rotatably to the installing seat, and having a surrounding wall that is formed with a surrounding wall opening. When the rotating plate is in an opened position, the surrounding wall opening is registered with the slot opening of the slotting space to allow the tab module to move out of the slotting space. When the rotating plate is in a closed position, the surrounding wall opening is away from the slot opening, and the surrounding wall blocks the slot opening so that the tab module is not allowed to be removed from the slotting space.

7 Claims, 10 Drawing Sheets

(56) References Cited

U.S. PATENT DOCUMENTS

| | | | | |
|---|---|---|---|---|
| 10,371,310 | B1 * | 8/2019 | Schulter | F16M 11/2078 |
| 10,401,710 | B2 * | 9/2019 | Wilson | F16M 11/14 |
| 10,753,529 | B2 * | 8/2020 | Hung | F16M 11/2064 |
| 10,914,420 | B2 * | 2/2021 | Hung | F16M 11/2092 |
| 10,976,001 | B2 * | 4/2021 | Hung | F16M 11/2014 |
| 11,112,057 | B2 * | 9/2021 | Janechek | F16M 11/2042 |
| 12,385,595 | B2 * | 8/2025 | Xu | F16M 11/42 |
| 2007/0102607 | A1 * | 5/2007 | Koh | F16M 11/2064 248/276.1 |
| 2010/0084527 | A1 * | 4/2010 | Lau | F16M 11/10 248/217.4 |
| 2011/0315843 | A1 * | 12/2011 | Hung | F16M 13/022 248/278.1 |
| 2020/0109799 | A1 * | 4/2020 | Hung | F16M 11/045 |
| 2022/0117103 | A1 * | 4/2022 | Kang | G06F 1/1601 |

FOREIGN PATENT DOCUMENTS

| | | | | |
|---|---|---|---|---|
| EP | 1139003 | A2 * | 10/2001 | F16M 11/041 |
| EP | 2369219 | A2 * | 9/2011 | F16M 13/02 |
| WO | WO-2006132938 | A2 * | 12/2006 | F16M 11/14 |

* cited by examiner

CONNECTING DEVICE FOR A SUSPENSION ARM APPARATUS

CROSS-REFERENCE TO RELATED APPLICATION

This application claims priority to Taiwanese Invention patent application No. 112129349, filed on Aug. 4, 2023, the entire disclosure of which is incorporated by reference herein.

FIELD

The disclosure relates to a connecting device for an arm apparatus, and more particularly to a connecting device for a suspension arm apparatus.

BACKGROUND

A conventional mounting interface of a conventional monitor follows the VESA (Video Electronics Standards Association) standards. To mount the conventional monitor to a table or a wall, a user would fix the conventional monitor to an adapter plate, and then mount the adapter plate to a bracket that is fixed to the table or to the wall.

A conventional mounting process of mounting the conventional monitor to a conventional bracket is as follows. The user would first fix the adapter plate to the conventional monitor, and then connect the adapter plate, to which the conventional monitor is fixed, to the conventional bracket with screws. In order to dismount the conventional monitor from the conventional bracket, the screws have to be unscrewed. While screwing or unscrewing the screws, the user has to use one hand to operate the screwdriver, and use the other hand to hold the conventional monitor so as to prevent the conventional monitor from falling, which makes the conventional mounting process difficult.

SUMMARY

Therefore, an object of the disclosure is to provide a connecting device that can alleviate at least one of the drawbacks of the prior art.

According to the disclosure, the connecting device is adapted to be mounted between a monitor and a supporting arm device. The connecting device includes an installing seat, a tab module, and a rotating plate. The installing seat is adapted to be mounted to the supporting arm device, and defines a slotting space extending in a first direction. The slotting space has a slot opening that opens in the first direction. The tab module is disposed in the slotting space, is removable from the slotting space in the first direction via the slot opening, and is adapted to be removably connected to the monitor. The rotating plate is coupled to the installing seat, is rotatable about a rotary axis, and has a surrounding wall formed with a surrounding wall opening. The rotating plate is rotatable about the rotary axis relative to the installing seat between an opened position and a closed position.

When the rotating plate is in the opened position, the surrounding wall opening is registered with the slot opening of the slotting space to allow the tab module to move in the first direction out of the slotting space via the slot opening and the surrounding wall opening. When the rotating plate is in the closed position, the surrounding wall opening is away from the slot opening, and the surrounding wall blocks the slot opening so that the tab module is not allowed to be removed from the slotting space via the slot opening and the surrounding wall opening.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
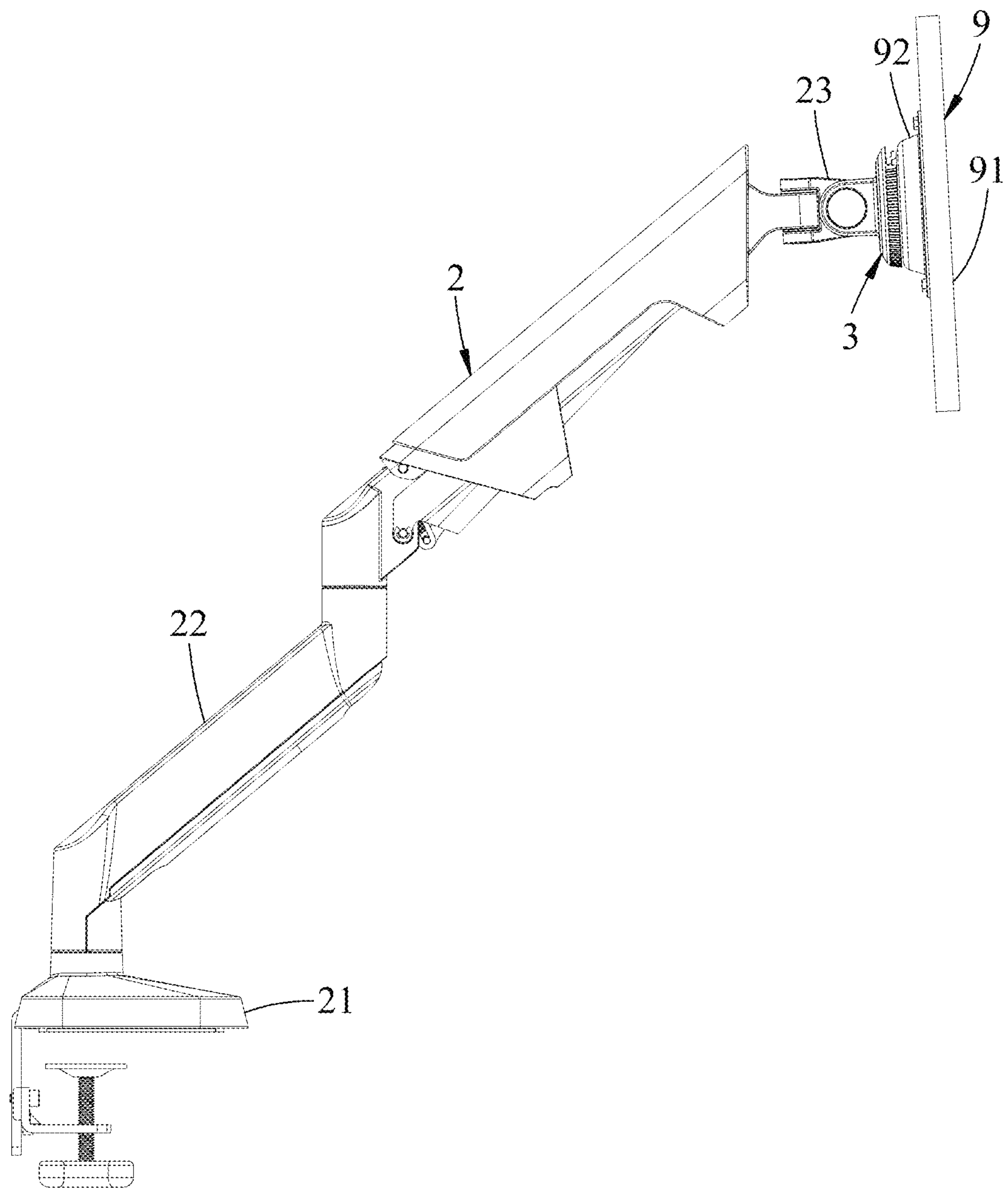
FIG. 1 is a side view illustrating an embodiment of a connecting device according to the disclosure being connected to a supporting arm device and a monitor.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features May be oriented differently (e.g., rotated 90 degrees or at other orientations) and the spatially relative terms used herein may be interpreted accordingly.

Figure 2:
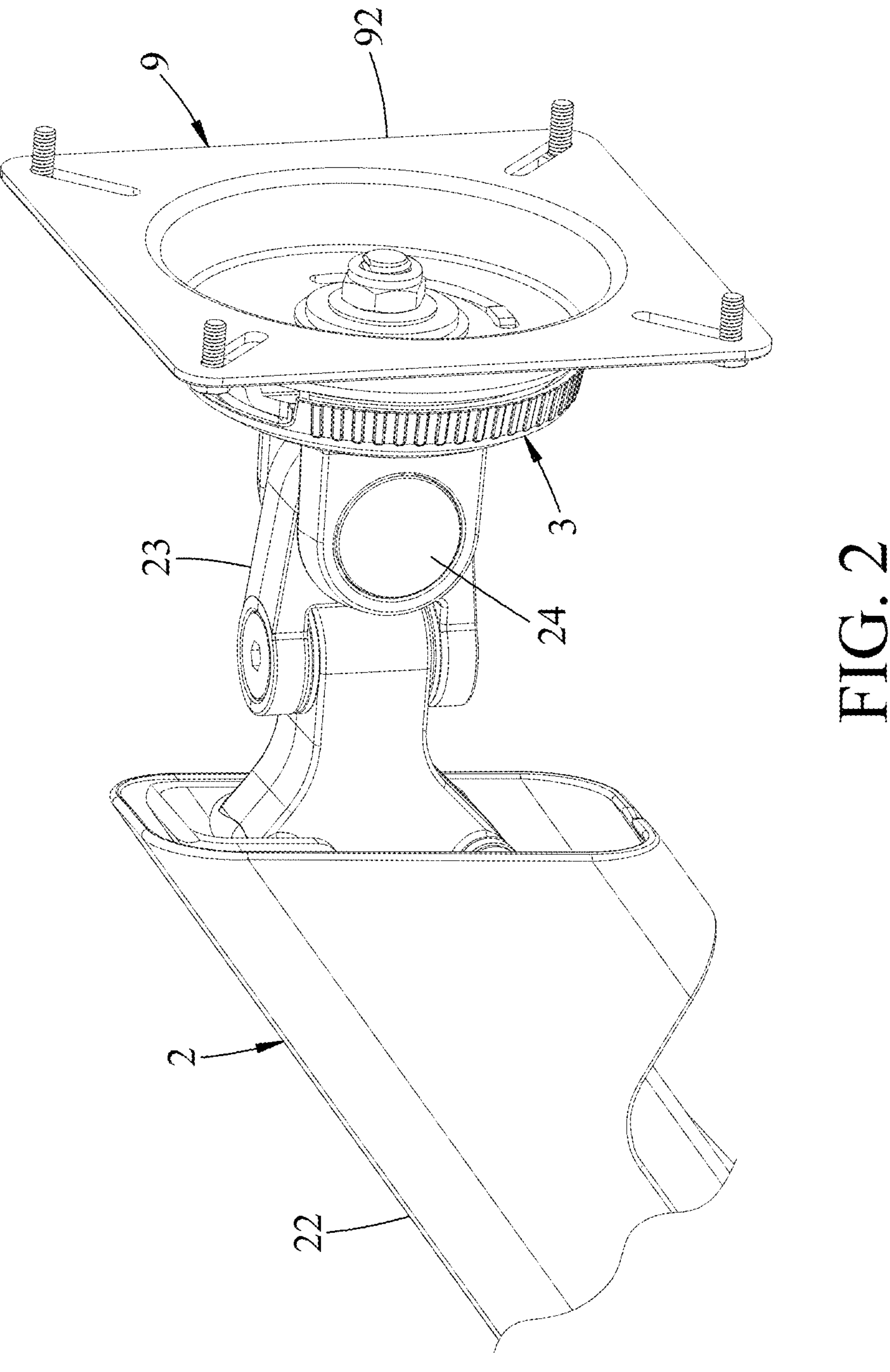
FIG. 2 is a fragmentary perspective view, illustrating the embodiment being connected to an adaptor plate and the supporting arm device.
Figure 3:
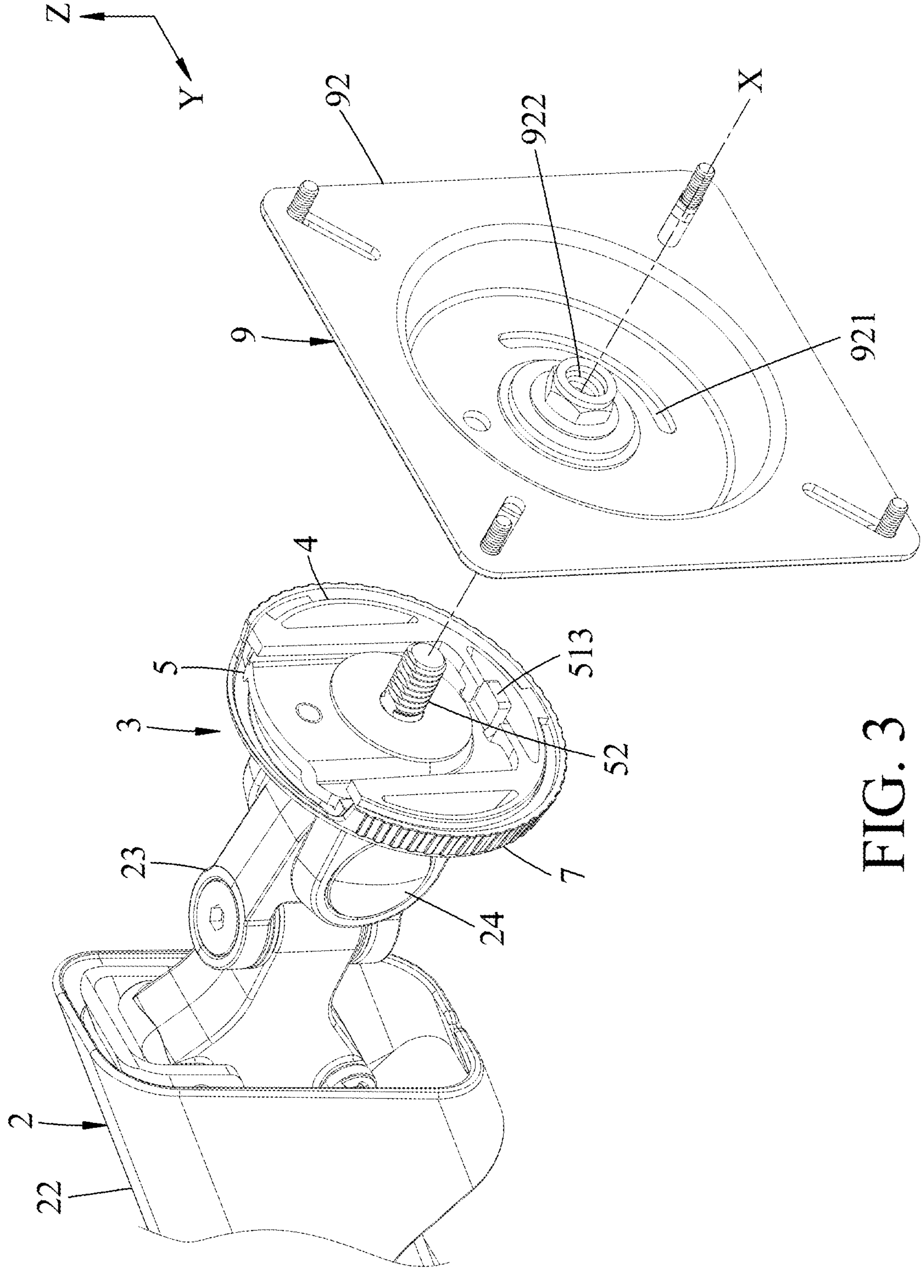
FIG. 3 is a fragmentary partially exploded perspective view illustrating the embodiment, the adaptor plate and the supporting arm device.

Referring to FIGS. 1 to 3, an embodiment of a connecting device 3 according to the disclosure is adapted to be mounted in a suspension arm apparatus, and the suspension arm apparatus (aside from the connecting device 3) includes a supporting arm device 2. The connecting device 3 is adapted to be mounted between a monitor 9 and the supporting arm device 2. The monitor 9 includes a screen 91, and an adapter plate 92 that is connected to the screen 91, and that is formed with an adapter slot 921 and a threaded hole 922.

Figure 4:
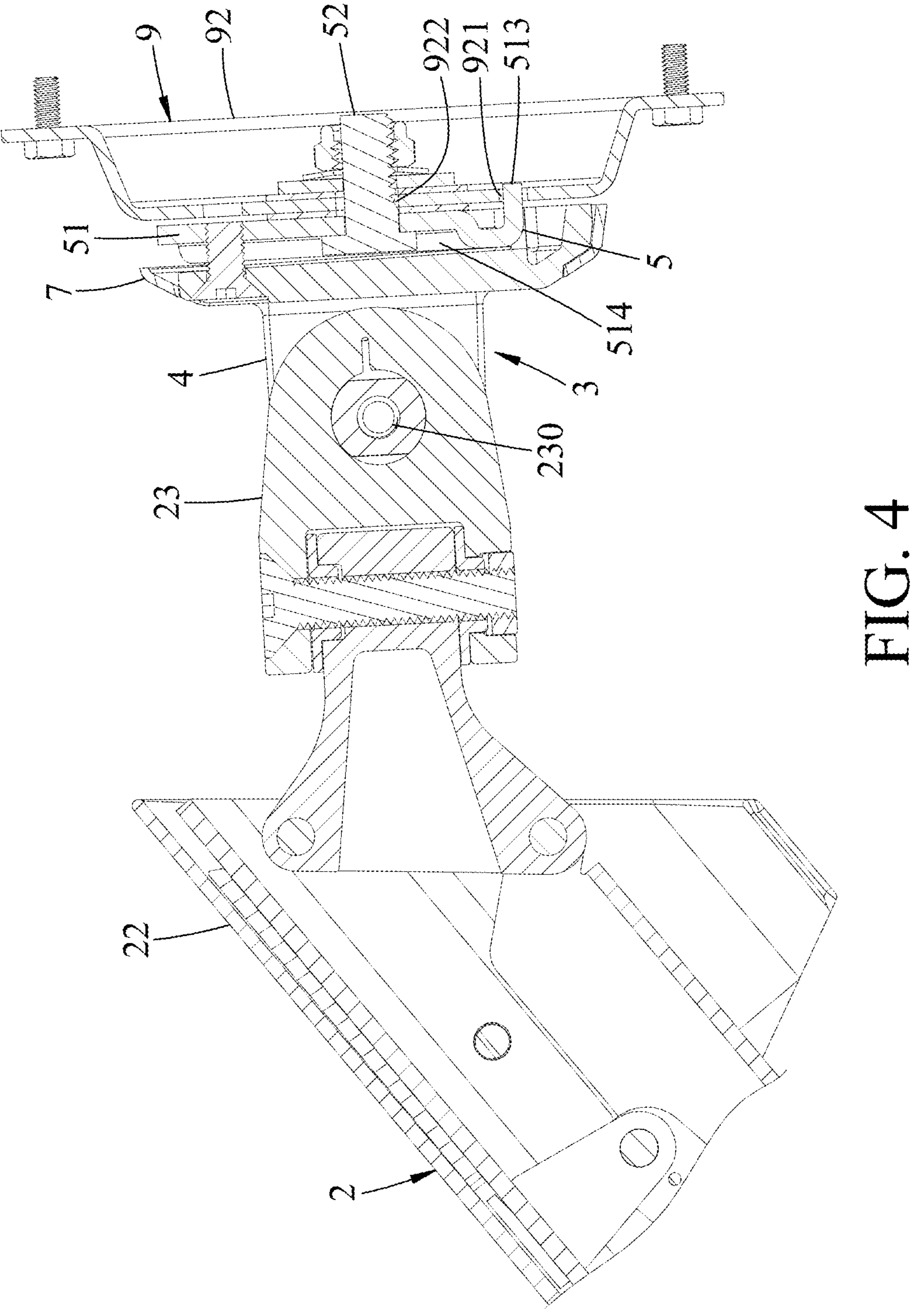
FIG. 4 is a fragmentary sectional view illustrating the embodiment, the adaptor plate and the supporting arm device.
Figure 5:
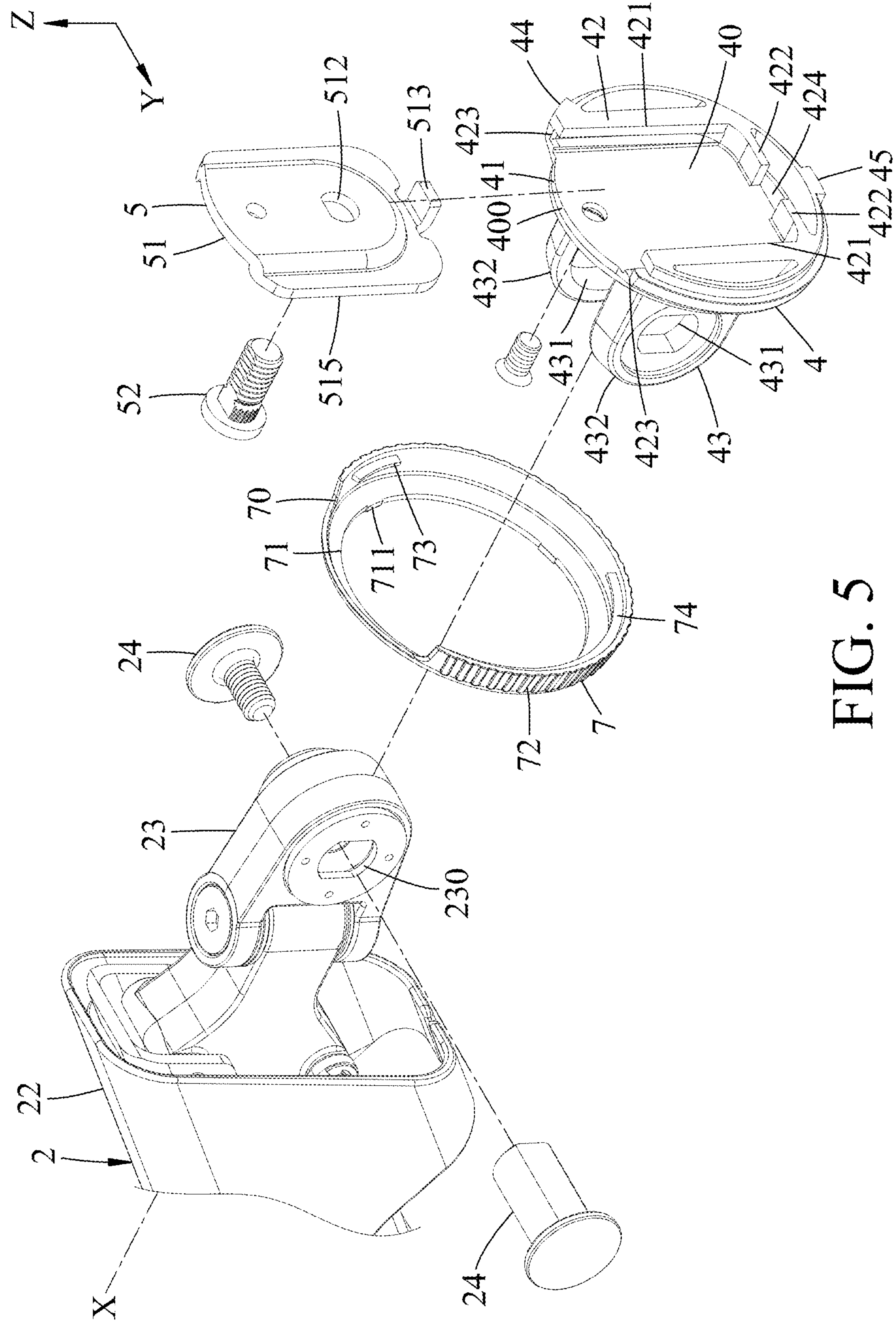
FIG. 5 is a fragmentary exploded perspective view illustrating the embodiment and the supporting arm device.

Referring to FIGS. 1, 4 and 5, the supporting arm device 2 includes a base seat 21 that is operable for clamping onto a flat plate (e.g., a table top, which is not shown), a suspension arm 22 that is rotatably connected to the base seat 21, a pivoting seat 23 that is connected to an end of the suspension arm 22 opposite to the base seat 21, and that is formed with a shaft hole 230, and two fixing members 24 that are coupled to each other, and that extend into the shaft hole 230 from opposite sides of the shaft hole 230, respectively.

Referring to FIGS. 3 to 6, the connecting device 3 is adapted to be disposed between the adapter plate 92 and the supporting arm device 2, and includes an installing seat 4, a tab module 5, and a rotating plate 7.

The installing seat 4 is adapted to be mounted to the pivoting seat 23 of the supporting arm device 2, and includes a base wall 41, a fixing wall 42 extending from the base wall 41 along a rotary axis (X), a pivoting joint member 43 connected to the base wall 41 opposite to the fixing wall 42, and adapted to be pivotally connected to the supporting arm device 2, and a first rib member 44 and a second rib member 45 disposed on the base wall 41 and angularly spaced apart with respect to the rotary axis (X).

The installing seat 4 defines a slotting space 40 extending in a first direction (Z). Specifically, the base wall 41 and the fixing wall 42 cooperatively define the slotting space 40. The slotting space 40 has a slot opening 400 that opens in the first direction (Z). It should be noted that the rotary axis (X) extends in a direction transverse to the first direction (Z).

The fixing wall 42 has two guiding portions 421 that are spaced apart from each other in a second direction (Y) transverse to the first direction (Z) and the rotary axis (X), and two extension portions 422. The extension portions 422 extend respectively from the guiding portions 421 toward each other. Each of the guiding portions 421 is formed with a socket slot 423 that extends in the first direction (Z) and that spatially communicates with the slotting space 40. The extension portions 422 cooperatively define an open slot 424 that is adapted to be aligned with the adapter slot 921.

Figure 6:
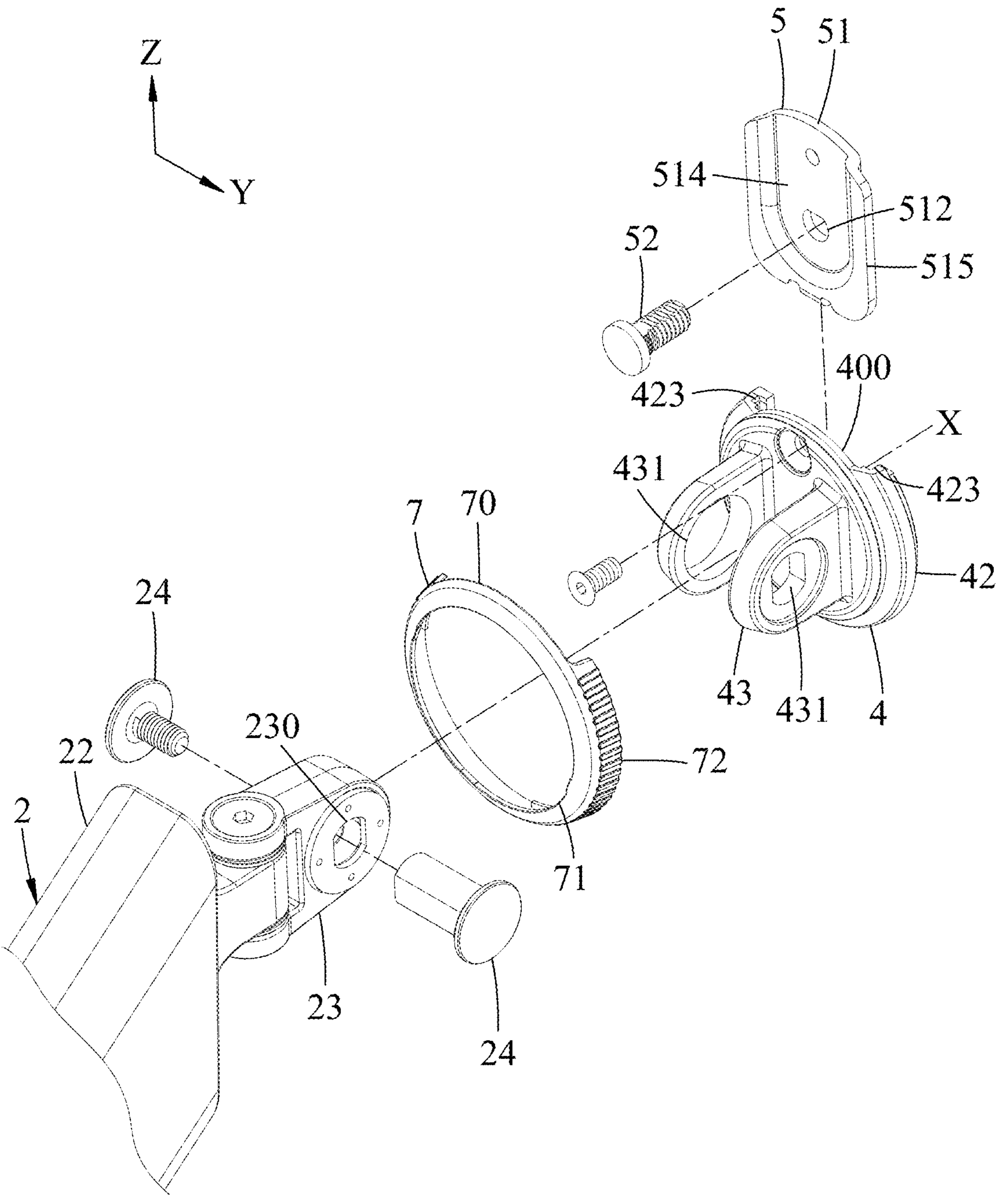
FIG. 6 is a fragmentary exploded perspective view similar to FIG. 5, but viewed from a different angle.
Figure 7:
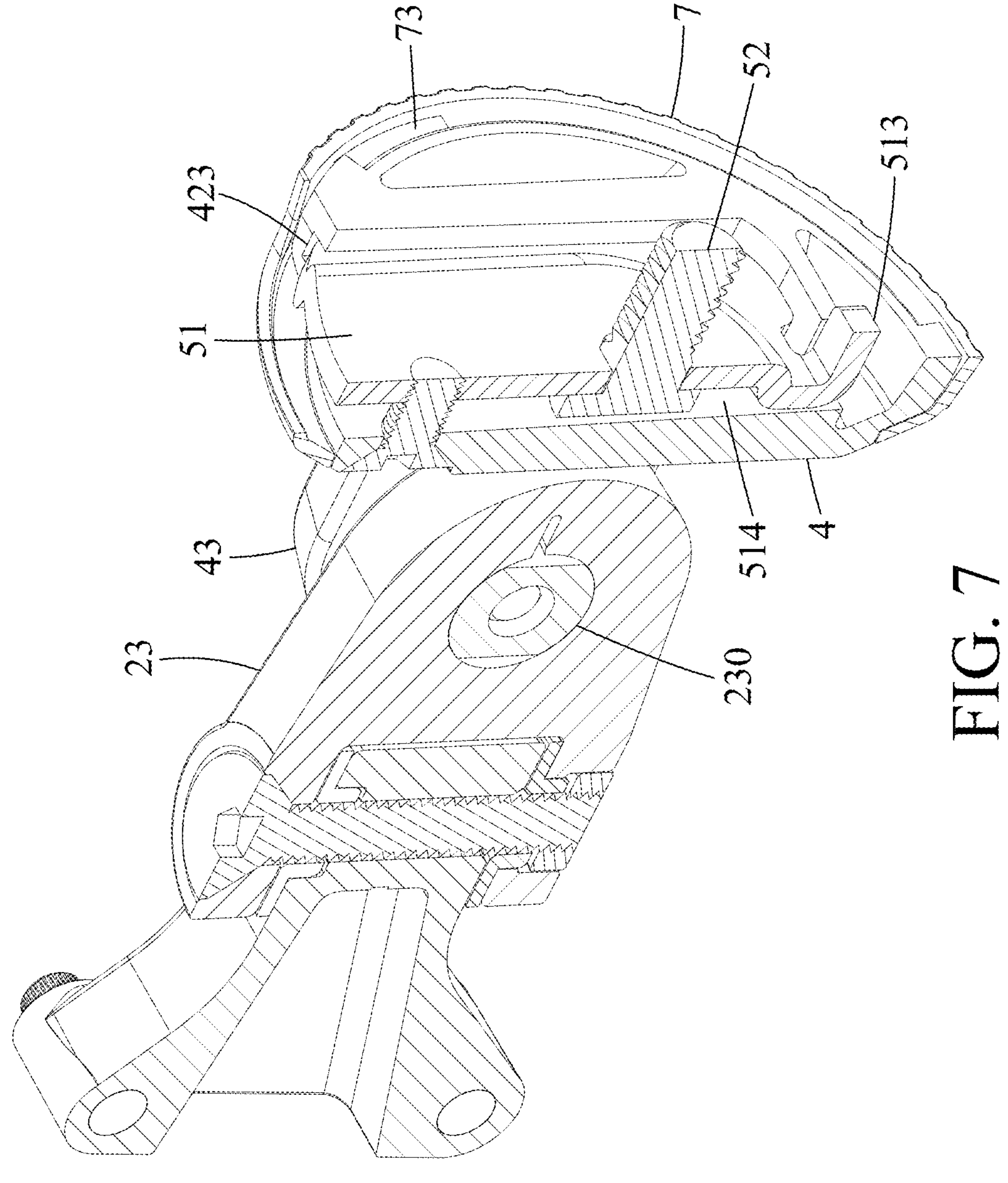
FIG. 7 is a perspective cutaway view of the embodiment.
Figure 8:
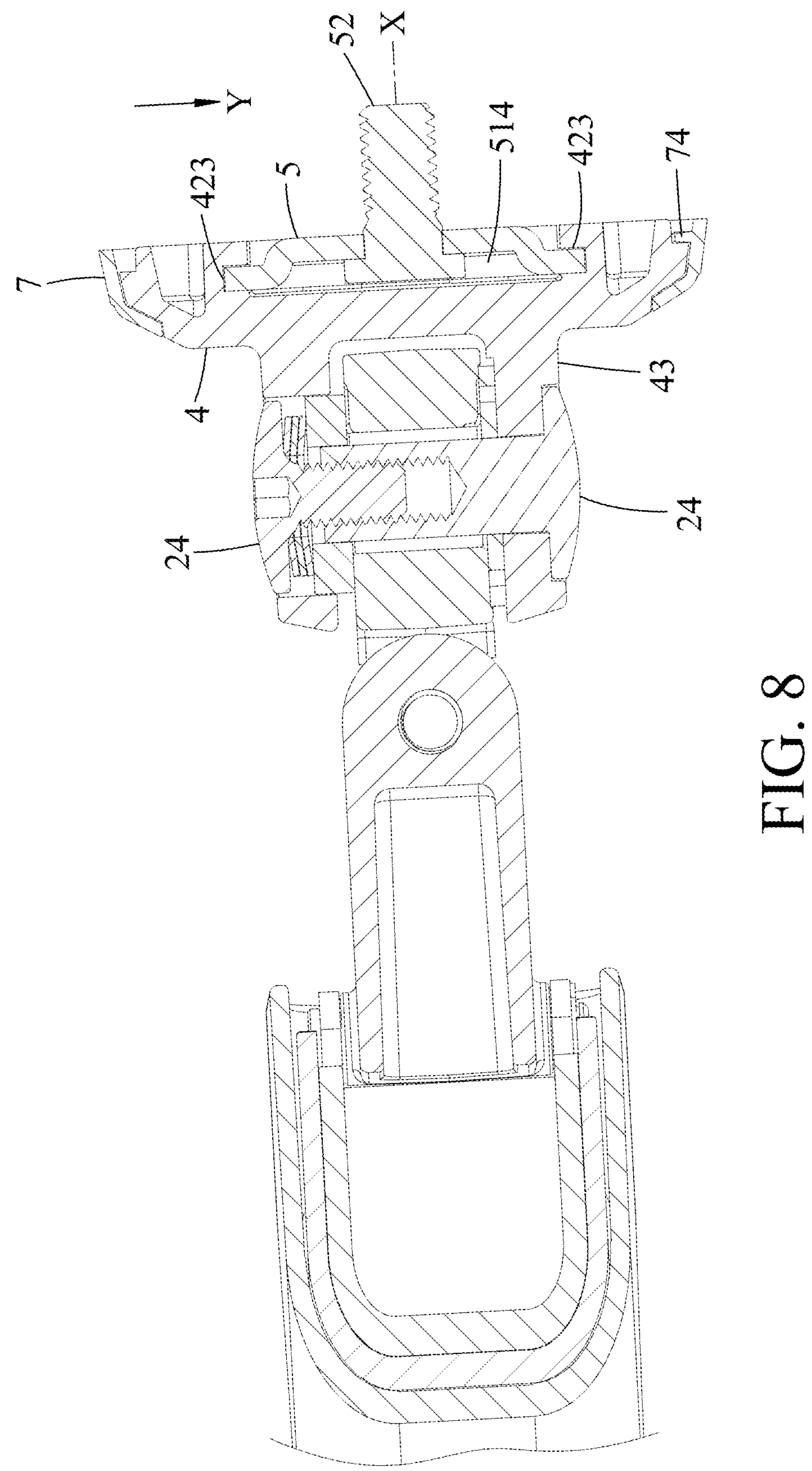
FIG. 8 is a fragmentary sectional view illustrating the embodiment and the supporting arm device.

Referring to FIGS. 5, 6 and 8, the pivoting joint member 43 has two pivoting joint bodies 432 that are spaced apart from each other in the second direction (Y), and each of the pivoting join bodies 432 is formed with a pivoting hole 431. The pivoting joint bodies 432 are adapted to be disposed on opposite sides of the pivoting seat 23 with the pivoting holes 431 being aligned with the shaft hole 230 in the second direction (Y). Specifically, the pivoting holes 431 are adapted to have the fixing members 24 be respectively disposed therethrough and connect the pivoting joint portion 43 to the pivoting seat 23.

Referring to FIGS. 4 to 7, the tab module 5 is adapted to be removably connected to the adapter plate 92, is disposed in the slotting space 40, and is removable from the slotting space 40 in the first direction (Z) via the slot opening 400. Specifically, the tab module 5 has a tab body 51 that is disposed in the slotting space 40, and that is removable from the slotting space 40 in the first direction (Z), and a connecting member 52 that is adapted to be connected to the monitor 9. The tab body 51 is formed with a connecting hole 512, and defines an accommodating slot 514 spatially communicating with the connecting hole 512. The connecting member 52 has an end portion disposed in the accommodating slot 514 and abutting against the tab body 51, and an opposite end portion extending through the connecting hole 512 and adapted to be connected to the monitor 9.

The tab body 51 has a limiting member 513 extending parallel to the rotary axis (X) and adapted to extend through the adapter slot 921. In this embodiment, the adapter slot 921 has a quarter arc shape around the rotary axis (X), so that the adapter plate 92 is limited to rotation of a quarter circle around the rotary axis (X) relative to the connecting device 3.

The tab body 51 further has a slotting portion 515 that is disposed at an outer periphery of the tab body 51, that has a shape corresponding to a shape of the guiding portions 421, and that slidably engages the socket slots 423.

The rotating plate 7 is coupled to the installing seat 4, is rotatable about the rotary axis (X), and has an annular wall 71 that surrounds the rotary axis (X) and that has a circular shape, and a surrounding wall 72 that extends along the rotary axis (X) from an outer periphery of the annular wall 71, and that is formed with a surrounding wall opening 70. Specifically, the surrounding wall opening 70 is defined between the surrounding wall 72 and the annular wall 71.

Figure 9:
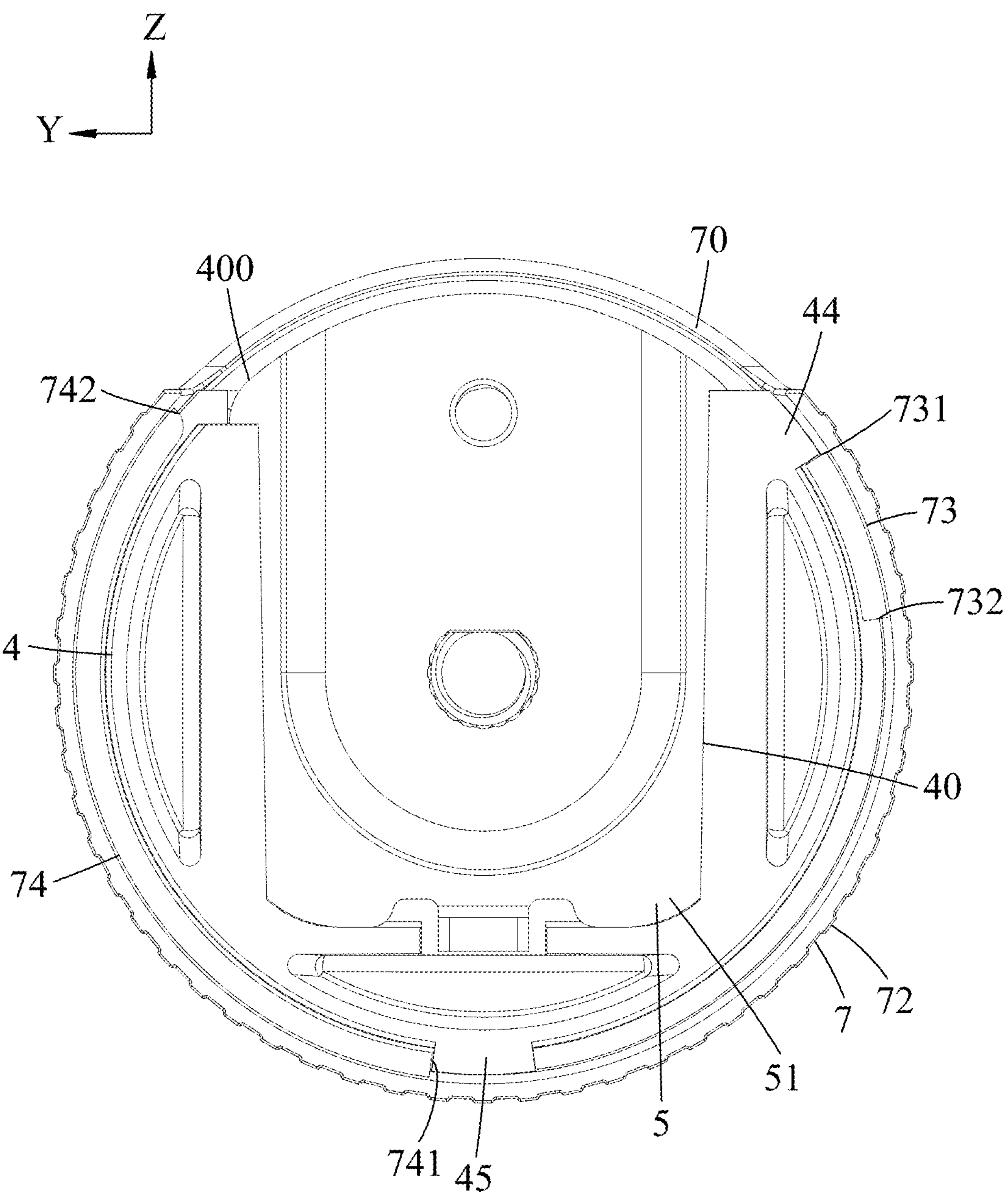
FIG. 9 is a side view of the embodiment, illustrating a rotating plate in an opened position.

Referring to FIGS. 5, 8 and 9, the surrounding wall 72 has a first rib segment 73 that extends inwardly towards the rotary axis (X), and that is engaged with an outer periphery of the fixing wall 42, and a second rib segment 74 that is angularly spaced apart from the first rib segment 73 with respect to the rotary axis (X), and that is engaged with the outer periphery of the fixing wall 42.

Figure 10:
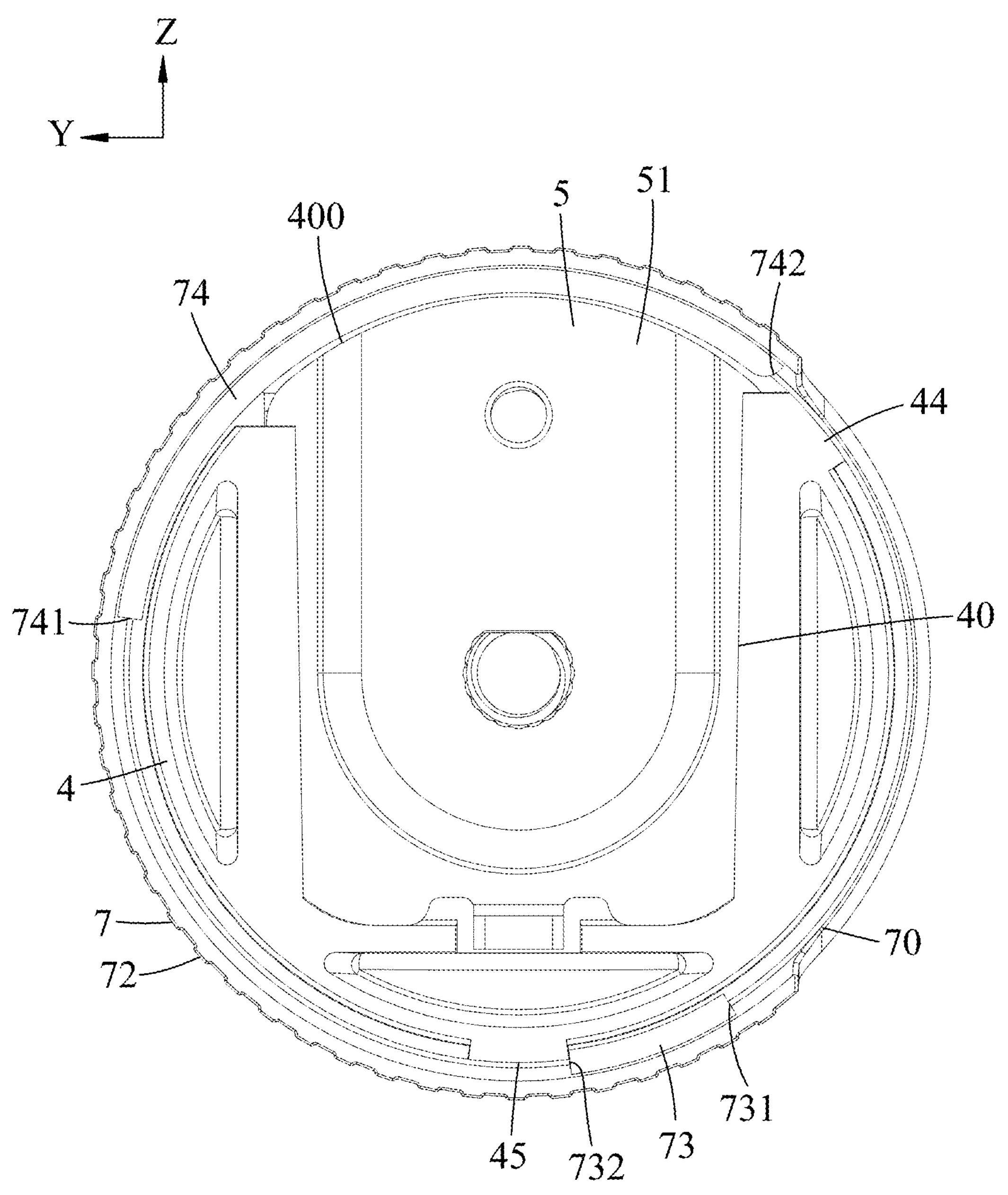
FIG. 10 is a side view of the embodiment, illustrating the rotating plate in a closed position.

Referring to FIGS. 5, 9 and 10, the first rib segment 73 has a first opening end 731 and a first closing end 732 disposed opposite to the first opening end 731. The second rib segment 74 has a second opening end 741 and a second closing end 742 disposed opposite to the second opening end 741.

The rotating plate 7 is rotatable about the rotary axis (X) relative to the installing seat 4 between an opened position (see FIG. 9) and a closed position (see FIG. 10). When the rotating plate 7 is in the opened position, the surrounding wall opening 70 is registered with the slot opening 400 of the slotting space 40 to allow the tab module 5 to move in the first direction (Z) out of the slotting space 40 via the slot opening 400 and the surrounding wall opening 70. When the rotating plate 7 is in the closed position, the surrounding wall opening 70 is away from the slot opening 400, and the surrounding wall 72 blocks the slot opening 400 so that the tab module 5 is not allowed to be removed from the slotting space 40 via the slot opening 400 and the surrounding wall opening 70.

Referring to FIGS. 1, 5, 9 and 10, to mount the monitor 9 to the supporting arm device 2, the rotating plate 7 is rotated about the rotary axis (X) in a first rotational direction (i.e., a counterclockwise direction) to the opened position. At this time, the first opening end 731 of the first rib segment 73 abuts against the first rib member 44 of the installing seat 4, and the second opening end 741 abuts against the second rib member 45, such that further rotation of the rotating plate 7 in the first rotational direction is arrested. When the rotating plate 7 is in the opened position, the tab module 5 is allowed to move in a direction opposite to the first direction (Z) into the slotting space 40, thereby allowing the user to mount the tab module 5 to the installing seat 4. To prevent the tab module 5 from being dismounted from the installing seat 4, the rotation plate 7 is rotated about the rotary axis (X) in a second rotational direction (i.e., a clockwise direction) to the closed position. At this time, the first closing end 732 of the first rib segment 73 abuts against the second rib member 45 of the installing seat 4, such that further rotation of the rotating plate 7 in the second rotational direction is arrested.

To dismount the monitor 9 from the supporting arm device 2, the rotating plate 7 is rotated about the rotary axis (X) in the first rotational direction to the opened position, so that the surrounding wall opening 70 is registered with the slot opening 400 of the slotting space 40, thereby allowing the user to move the tab module 5 in the first direction (Z) out of the slotting space 40.

It should be noted that, during a movement of the rotating plate 7 from the opened position to the closed position, the first rib segment 73 is moved along an arc path that is longer than an arc length along the outer periphery of the annular wall 71 between opposite ends of the surrounding wall opening 70.

In conclusion, a number of effects of the connecting device 3 are as follows.

1. Since the installing seat 4 is connected to the supporting arm device 2, and the tab module 5 is connected to the monitor 9, and since the tab module 5 may be inserted into or removed from the slotting space 40, the tab module 5, along with the monitor 9, may be quickly mounted to or dismounted from the supporting arm device 2. Compared to the aforementioned conventional mounting process which requires the adapter plate to be screwed to the bracket, it is easier to mount the monitor 9 to or dismount the monitor 9 from the supporting arm device 2.

2. The first rib segment 73, the first rib member 44, and the second rib member 45 limit the arc path of the first rib segment 73, along which the first rib segment 73 moves, so as to restrict rotation of the rotating plate 7, which arrests further rotation of the rotating plate 7 and prevents the surrounding wall opening 70 from being erroneously registered with the slot opening 400 when the rotating plate 7 is rotated in the second rotational direction, thereby preventing the tab module 5 from being removed from the slotting space 40 and from being dismounted from the installing seat 4 (which would result in falling of the monitor 9). Hence, an objective of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A connecting device adapted to be mounted between a monitor and a supporting arm device, said connecting device comprising:

an installing seat that is adapted to be mounted to the supporting arm device, and that defines a slotting space extending in a first direction, said slotting space having a slot opening that opens in the first direction;

a tab module that is disposed in said slotting space, that is removable from said slotting space in the first direction via said slot opening, and that is adapted to be removably connected to the monitor; and a rotating plate that is coupled to said installing seat, that is rotatable about a rotary axis, and that has a surrounding wall formed with a surrounding wall opening;

wherein, said rotating plate is rotatable about the rotary axis relative to said installing seat between an opened position and a closed position;

wherein, when said rotating plate is in the opened position, said surrounding wall opening is registered with said slot opening of said slotting space to allow said tab module to move in the first direction out of said slotting space via said slot opening and said surrounding wall opening; and wherein, when said rotating plate is in the closed position, said surrounding wall opening is away from said slot opening, and said surrounding wall blocks said slot opening so that said tab module is not allowed to be removed from said slotting space via said slot opening and said surrounding wall opening.

2. The connecting device as claimed in claim 1, wherein:

said rotating plate further has an annular wall surrounding the rotary axis, said surrounding wall extending along said rotary axis from an outer periphery of said annular wall; and said surrounding wall opening is defined between said surrounding wall and said annular wall.

3. The connecting device as claimed in claim 1, wherein:

said installing seat includes a base wall, and a first rib member and a second rib member that are disposed on said base wall and that are angularly spaced apart with respect to the rotary axis;

said surrounding wall has a first rib segment extending inwardly towards the rotary axis;

when said rotating plate is rotated about the rotary axis in a first rotational direction to the opened position, said first rib segment abuts against said first rib member of said installing seat, such that further rotation of said rotating plate in the first rotational direction is arrested; and when said rotation plate is rotated about the rotary axis in a second rotational direction to the closed position, said first rib segment abuts against said second rib member of said installing seat, such that further rotation of said rotating plate in the second rotational direction is arrested.

4. The connecting device as claimed in claim 3, wherein:

said rotating plate further has an annular wall surrounding the rotary axis, said surrounding wall extending along said rotary axis from an outer periphery of said annular wall; and during a movement of said rotating plate from the opened position to the closed position, said first rib segment is moved along an arc path that is longer than an arc length along said outer periphery of said annular wall between opposite ends of said surrounding wall opening.

5. The connecting device as claimed in claim 3, wherein said installing seat further includes a fixing wall extending from said base wall along the rotary axis and cooperating with said base wall to define said slotting space, and a pivoting joint member connected to said base wall, disposed opposite to said fixing wall, and adapted to be pivotally connected to the supporting arm device.

6. The connecting device as claimed in claim 1, wherein: said tab module has a tab body that is disposed in said slotting space, that is removable from said slotting space in the first direction, that is formed with a connecting hole, and that defines an accommodating slot spatially communicating with said connecting hole; and a connecting member that has an end portion disposed in said accommodating slot and abutting against said tab body, and an opposite end portion extending through said connecting hole and adapted to be connected to the monitor.

7. The connecting device as claimed in claim 1, wherein: the rotary axis extends in a direction transverse to the first direction;

said installing seat includes a base wall, and a fixing wall extending from said base wall along the rotary axis and cooperating with said base wall to define said slotting space; and said fixing wall has two guiding portions that are spaced apart from each other, each of said guiding portions being formed with a socket slot that extends in the first direction and that spatially communicates with said slotting space, said tab module slidably engaging said socket slots.

* * * * *